(12) United States Patent
Venter et al.

(10) Patent No.: US 9,989,122 B2
(45) Date of Patent: Jun. 5, 2018

(54) PLANETARY GEAR DEVICE AND JET ENGINE WITH A PLANETARY GEAR DEVICE

(71) Applicant: Rolls-Royce Deutschland Ltd & Co KG, Blankenfelde-Mahlow (DE)

(72) Inventors: Gideon Daniel Venter, Berlin (DE); David Krueger, Potsdam (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days. days.

(21) Appl. No.: 15/386,796

(22) Filed: Dec. 21, 2016

(65) Prior Publication Data

US 2017/0184181 A1 Jun. 29, 2017

(30) Foreign Application Priority Data

Dec. 23, 2015 (DE) .................. 10 2015 122 813

(51) Int. Cl.
*F16H 1/28* (2006.01)
*F16H 57/08* (2006.01)
*F02C 7/36* (2006.01)

(52) U.S. Cl.
CPC ............... *F16H 1/28* (2013.01); *F02C 7/36* (2013.01); *F16H 57/08* (2013.01); *F05D 2260/40311* (2013.01)

(58) Field of Classification Search
USPC ....................................................... 475/338
See application file for complete search history.

(56) References Cited

U.S. PATENT DOCUMENTS

| 4,873,894 A | 10/1989 | Avery et al. |
| 5,429,558 A | 7/1995 | Lagarde |
| 6,080,199 A * | 6/2000 | Umeyama ........... F16H 55/0806 |
| | | 29/893.3 |

(Continued)

FOREIGN PATENT DOCUMENTS

| CN | 201851630 | 6/2011 |
| CN | 201851630 U | 6/2011 |

(Continued)

OTHER PUBLICATIONS

European Search Report dated May 10, 2017 for counterpart European Application No. 16205759.0.

(Continued)

*Primary Examiner* — Dirk Wright
(74) *Attorney, Agent, or Firm* — Shuttleworth & Ingersoll, PLC; Timothy J. Klima

(57) ABSTRACT

A planetary gear device with at least one sun wheel, a ring gear and at least one planetary wheel that is in mesh with the sun wheel as well as with the ring gear, and that is mounted in a rotatable manner on a planetary carrier. A pressure angle (αph) between the tooth flanks of the teeth of the ring gear and of the planetary wheel, which are in mesh with each other during the main rotational direction of the planetary carrier, is larger than a pressure angle between the tooth flanks of the teeth of the planetary wheel and of the sun wheel, which are in mesh with each other at the same time. What is further proposed is a jet engine of an aircraft with such a planetary gear device.

15 Claims, 4 Drawing Sheets

(56) References Cited

U.S. PATENT DOCUMENTS 6,364,805 B1    4/2002  Stegherr

FOREIGN PATENT DOCUMENTS

| DE | 69308437 T2 | | 9/1997 |
|----|----|----|----|
| DE | 19844843 A1 | | 4/2000 |
| DE | 102014213145 A1 | | 1/2016 |
| EP | 2402631 A1 | | 1/2012 |
| JP | 59151666 A | * | 8/1984 |
| WO | WO9527860 A1 | | 10/1995 |

OTHER PUBLICATIONS

German Search Report dated Sep. 22, 2016 from counterpart German Application No. 102015122813.0.

* cited by examiner

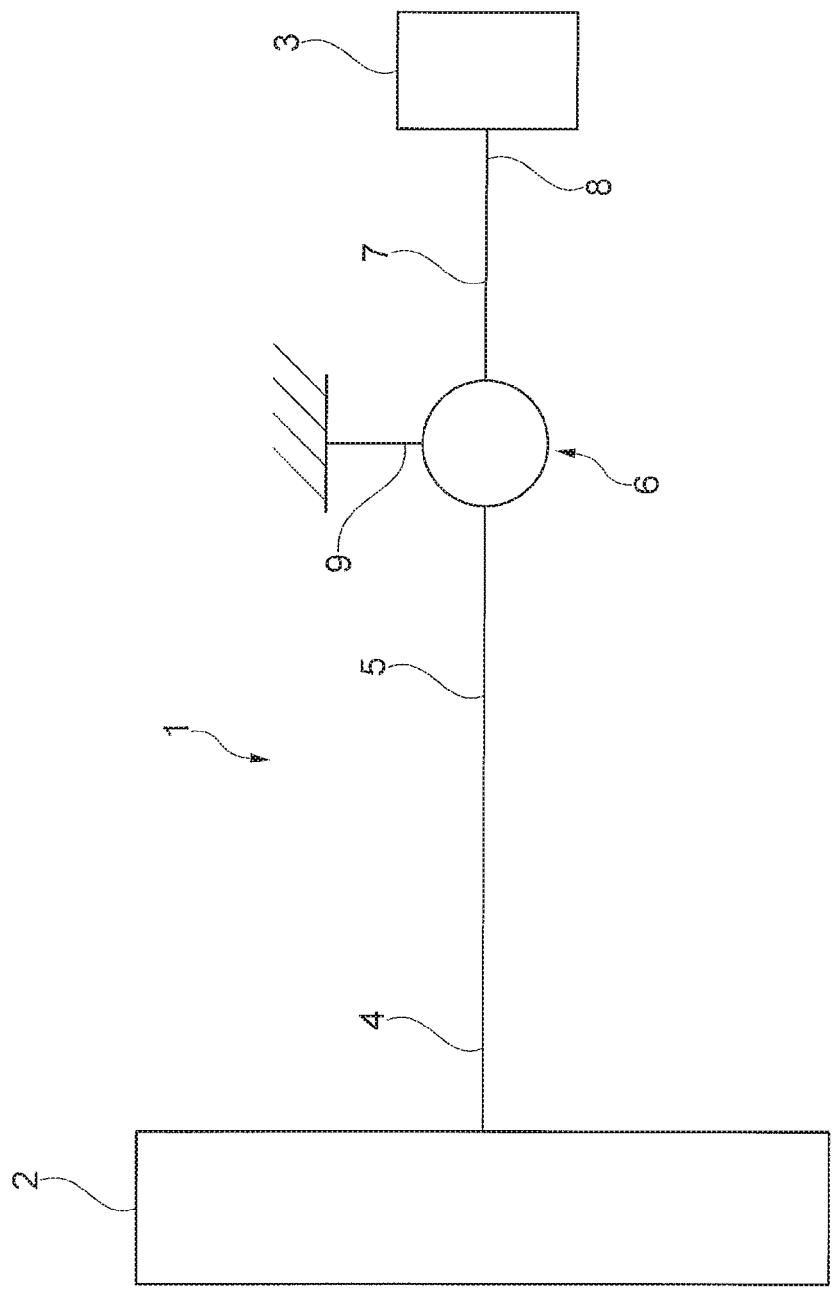

PLANETARY GEAR DEVICE AND JET ENGINE WITH A PLANETARY GEAR DEVICE

This application claims priority to German Patent Application DE102015122813.0 filed Dec. 23, 2015, the entirety of which is incorporated by reference herein.

The invention relates to a planetary gear device as well as to a jet engine with a planetary gear device according to the kind as it is more closely defined herein.

In planetary gear devices as they are known from practice with at least one sun wheel, one ring gear and at least one planetary wheel that is in mesh with the sun wheel as well as with the ring gear and that is mounted on a planetary carrier in a rotatable manner, a centrifugal force is respectively applied at the planetary wheel during the rotation of the planetary carrier, possibly causing undesirably high loads in the area of a bearing between the planetary wheel and the planetary carrier in combination with the meshing forces that are acting in the circumferential direction of the gear wheels. In general, high bearing loads require a corresponding design of the bearing in order to be able to operate a planetary gear device with a desirably long service life.

However, such a design of the planetary gear device disadvantageously results in high manufacturing costs and a high total weight of a planetary gear device in particular in the area of the bearing of the planetary wheel, which is particularly undesirable when used in the area of a jet engine or of an aircraft engine.

A planetary gear device with gear wheels that are configured with asymmetrical tooth profiles is known from CN 201 851 630. Here, the asymmetrical tooth profiles are chosen in such a manner that a load-bearing capacity of the gear wheels in the main operational rotational direction of the planetary gear device is considerably higher than in the rotational direction opposite thereto. For this purpose, a pressure angle between the tooth flanks of the teeth of a gear wheel embodied as a sun wheel that are in mesh with each other during the main operational rotational direction and of a gear wheel that is configured as a planetary wheel is larger than a pressure angle between the tooth flanks of the teeth of the gear wheel embodied as a ring gear and of the planetary wheel, which are in mesh with each other during the main operational rotational direction.

Also in this known solution, high loads occur in the main operational rotational direction in the area of a bearing between the planetary wheel and the planetary carrier during operation of the planetary gear device due to centrifugal forces that act in the area of the planetary wheels.

The present invention is based on the objective to provide a planetary gear device that is cost-effective and characterized by having low-weight structural components, and that has a sufficiently long service life even when high centrifugal forces occur in the area of a planetary wheel, and in addition to create a jet engine that is embodied with a planetary gear device, is cost-effective, has a low self-weight and can be operated with a low maintenance effort.

This objective is achieved by a planetary gear device as well as a jet engine according to the features disclosed herein.

In the planetary gear device according to the invention having at least one sun wheel, a ring gear and at least one planetary wheel that is in mesh with the sun wheel as well as with the ring gear and that is mounted in a rotatable manner on the planetary carrier, a pressure angle between the tooth flanks of the teeth of the ring gear and of the planetary wheel, which are in mesh with each other during a main rotational direction of the planetary carrier, is larger than a pressure angle between the tooth flanks of the teeth of the planetary wheel and of the sun wheel, which are in mesh with each other at the same time.

Due to the fact that according to the invention the toothings are embodied in an asymmetrical manner in the area of the sun wheel, the ring gear and the planetary wheel, a resulting radial toothing force component is created during operation of the planetary gear device during the main rotational direction of the planetary carrier respectively in the tooth meshing between the ring gear and the planetary wheel, which is opposite to the centrifugal force that is applied to the planetary wheel and by means of which a bearing load of the bearing between the planetary wheel and the rotating planetary carrier is decreased in a constructionally simple and cost-effective manner.

Due to the reduction of the bearing load, the bearing between the planetary wheel and the planetary carrier can be designed with a lower performance capability, and the planetary gear device can in total be embodied so as to be more cost-effective and so as to have a lower weight of structural components. In addition, the service life of the bearing is also increased as a result of the lower bearing load, so that maintenance expenditures are also low.

If the pressure angle between the tooth flanks of the teeth of the ring gear and of the planetary wheel, which are in mesh with each other during the main rotational direction of the planetary carrier, is greater than or equal to 25°, the bearing load of the bearing between the planetary wheel and the planetary carrier occurring during operation is reduced, which, among other things, results from a centrifugal force that is created by the mass of the planetary wheel, a rotational speed of the planetary carrier as well as a distance between the rotational axis of the planetary wheel and a rotational axis of the planetary carrier, since a radial force component that acts during operation in the toothing area and that is opposed to the centrifugal force that is applied at the planetary wheel increases with a growing distance between the pressure angles.

In an advantageous variant of the planetary gear device according to the invention, in which the loads of the bearing between the planetary wheel and the planetary carrier is further reduced as compared to the last described embodiment, the pressure angle between the tooth flanks of the teeth of the ring gear and of the planetary wheel, which are in mesh with each other during the main rotational direction of the planetary carrier, is larger than 30°.

In order to be able to reduce the bearing loads that are applied in the area of the bearing between the planetary wheel and the planetary carrier and that result from the centrifugal forces to a maximally possible degree, pressure angles of up to 60° are provided between the tooth flanks of the teeth of the ring gear and of the planetary wheel, which are in mesh with each another during the main rotational direction of the planetary carrier.

In a further advantageous embodiment of the planetary gear device according to the invention, the loads of the bearing between the planetary wheel and the planetary carrier are reduced by the fact that the pressure angle between the tooth flanks of the teeth of the planetary wheel and of the sun wheel, which are in mesh with each other during the main rotational direction of the planetary carrier, is greater than or equal to 10°.

In order to be able to embody the teeth of the planetary wheel with a sufficient tooth thickness, the pressure angle between the tooth flanks of the teeth of the planetary wheel and of the sun wheel, which are in mesh with each other during the main rotational direction of the planetary carrier, is smaller than or equal to 25° in a further advantageous embodiment of the planetary gear device according to the invention.

In the event that the torque to be transferred is correspondingly high, a load on the teeth of the planetary wheel and of the sun wheel can be limited to admissible values if a profile overlap in the meshing area between the toothing of the planetary wheel and the toothing of the sun wheel during the main rotational direction of the planetary carrier is greater than or equal to 2, wherein by definition a so-called high toothing is present in the present case in the contact area between the planetary wheel and the sun wheel.

In a further advantageous embodiment of the planetary gear device according to the invention, a profile overlap in the meshing area between the toothing of the planetary wheel and the toothing of the ring gear is smaller than 2 during the main rotational direction of the planetary carrier, whereby a tooth crest thickness of the teeth of the planetary wheel and of the sun wheel can be respectively dimensioned to a degree in which cases of damage are avoided and planetary gear device according to the invention can be operated with a high service life.

If the planetary wheel is embodied as a double planet wheel, an adjustment of the tooth profiles of the meshing teeth of the planetary wheel and of the ring gear depends to a lesser extent on the tooth profiles of the meshing teeth of the planetary wheel and of the sun wheel.

In an embodiment of the planetary gear device according to the invention that is easy and cost-effective to manufacture, the ring gear, the sun wheel and the planetary wheel are configured in a straight-toothed manner.

If the ring gear, the sun wheel and the planetary wheel are embodied in a helically toothed manner, the planetary gear device according to the invention can be embodied with a higher power density.

Here, there is the possibility that the ring gear, the sun wheel and the planetary wheel are respectively configured with double helical teeth, in which the axial force components that act in the area of the tooth meshings compensate one another and a total axial toothing force ideally equals zero.

The jet engine according to the invention with a fan and a low-pressure shaft that is operatively connected thereto comprises, in the area of the operative connection between the fan and the low-pressure shaft, a planetary gear device that is embodied to the previously described extent and can thus be manufactured with a lower weight of structural components as well as in a more cost-effective manner, and can be operated with lower maintenance expenditure as compared to jet engines that are known from the state of the art.

In advantageous further developments of the jet engine according to the invention, the fan is connected to the ring gear, the planetary carrier or the sun wheel, while the low-pressure shaft is operatively connected to the sun wheel, the planetary carrier or the ring gear.

The features specified in the patent claims as well as the features specified in the following exemplary embodiments of the planetary gear device according to the invention or of the jet engine according to the invention are suitable respectively alone or in any combination with one another to further develop the subject matter according to the invention.

Further advantages and advantageous embodiments of the planetary gear device according to the invention or of the jet engine according to the invention follow from the patent claims and the exemplary embodiments that are described in the following in principle by referring to the drawing, wherein with a view to clarity the same reference signs are used for structural components having the same structure and functionality.

Herein:

FIG. 1 shows a strongly schematized rendering of a partial area of a jet engine with a fan and with a turbine device, wherein the fan is connected in the area of a fan shaft to a shaft of a planetary gear device, which is coupled to a shaft of the turbine device via a further shaft.

Figure 3:
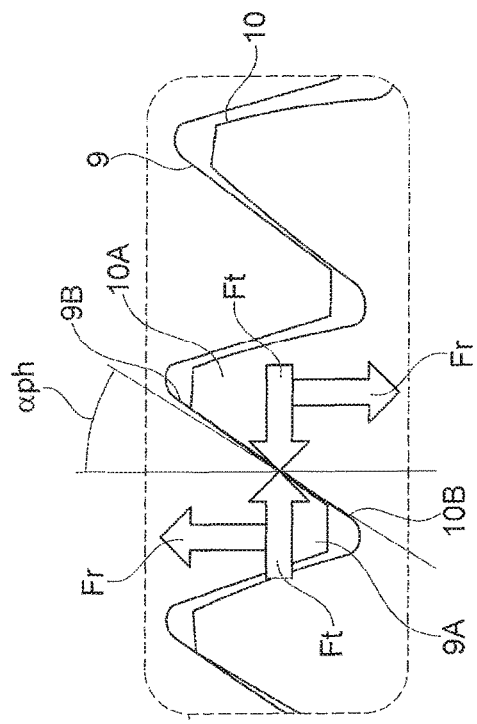
FIG. 3 shows an enlarged rendering of an area III that is more closely identified in FIG. 2 and that comprises a meshing area of a planetary wheel with a ring gear of the planetary gear device.

FIG. 1 shows a part of a jet engine 1 with a fan 2 and with a turbine device 3 in a strongly schematized rendering. In the area of a fan shaft 4, the fan 2 is in operative connection with a shaft 5 of a planetary gear device 6 which is coupled via another shaft 7 to a shaft 8 or a low-pressure shaft of the turbine device 3. An additional shaft 9 of the planetary gear device 6 is configured in a torque-proof manner.

Figure 2:
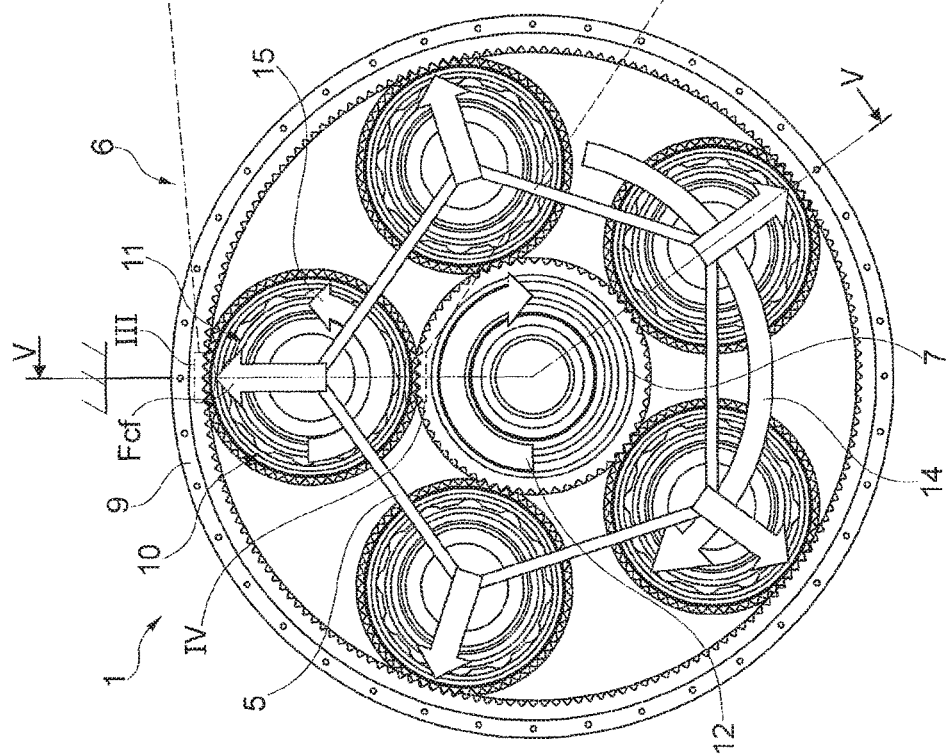
FIG. 2 shows a simplified isolated rendering of a first embodiment of the planetary gear device of the jet engine according to FIG. 1 in a side view.

FIG. 2 shows a schematized side view of a planetary gear device 6 of the jet engine 1 according to FIG. 1. Here, the shaft 5 is configured as a planetary carrier, the shaft 7 as a sun wheel, and the shaft 9 as a ring gear of the planetary gear device 6. Generally, the fan 2 and the turbine device 3 are connected to each other via the planetary gear device 6 in such a manner that the rotational speed of the shaft 8 of the turbine device 3 is larger than the rotational speed of the fan shaft 4 of the fan 2 by a factor that corresponds to the gear ratio of the planetary gear device 6, while the torque that is applied in the area of the fan shaft 4 is larger than the torque that is applied in the area of the shaft 8 of the turbine device 3 by a factor corresponding to the gear ratio of the planetary gear device 6.

As the fan 2 is driven from the turbine-device side, the planetary carrier 5 has its main rotational direction 14, and a torque that is introduced into the planetary gear device 6 via the shaft 8 of the turbine device 3 is transferred from the sun wheel 7 in the direction of the planetary carrier 5.

For this purpose, in the exemplary embodiments that are shown in the drawing, in the present case five planetary wheels 10 are arranged on the planetary carrier so as to be rotatable via bearing appliances 11. At that, it is also possible to embody the planetary gear device with a differing number of planetary wheels depending on the respectively present application case.

During operation of the aircraft engine 1, the planetary carrier 5 that is connected in a torque-proof manner to the fan shaft 4 as well as the sun wheel 7 and the planetary wheels 10 rotate. Due to the rotation of the planetary carrier 5 into its main rotational direction 14, increasing centrifugal forces Fcf are applied with increasing rotational speed of the planetary carrier 5 in the area of the planetary wheels 10 that are also rotating in the rotational direction 15, resulting in bearing forces in the area of the bearing appliances 11 in addition to the meshing forces or tangential forces Ft that act in the area of the tooth meshings between the planetary wheels 10 and the ring gear 9 as well as in the area of the tooth meshings between the planetary wheels 10 and the sun wheel 7 that then rotates in the rotational direction 12 respectively in the circumferential direction of the sun wheel 7, the planetary wheels 10, and the ring gear 9.

Figure 4:
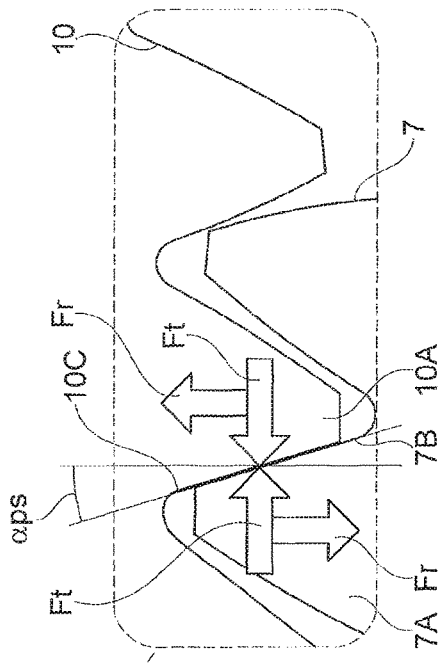
FIG. 4 shows a rendering of an area IV that is more closely identified in FIG. 2 and that corresponds to FIG. 3, comprising a meshing area of the planetary wheel of the planetary gear device with a sun wheel.

In order to at least reduce the bearing loads that result from the centrifugal forces that are applied in the area of the planetary wheels 10 due to the operating conditions, a pressure angle aph between tooth flanks 9B, 10B of teeth 9A, 10A of the ring gear 9 and of the planetary wheels 10, which are in mesh with each other during the main rotational direction 14 of the planetary carrier 5, is larger than a pressure angle aps between the tooth flanks 10C, 7B of the teeth 10A, 7A of the planetary wheels 10 and of the sun wheel 7, which are in mesh with each other at the same time. The asymmetrical tooth profiles of the teeth 9A, 10A and 7A, 10A of the ring gear 9 and the planetary wheels 10 as well as of the sun wheel 7 and of the planetary wheels 10 that are provided for this purpose are respectively shown in an enlarged and schematized view in certain areas in FIG. 3 and FIG. 4.

If the turbine device 3 drives the sun wheel 7 in the rotational direction 12 that is shown more closely in FIG. 2, the torque that is applied at the sun wheel 7 is transferred in the area of the tooth meshings between the planetary wheels 10 and the sun wheel 7 to the planetary wheels 10 and from there to the planetary carrier 5, which is operatively connected to the fan 2 in a torque-proof manner via the fan shaft 4 to the previously described extent. At the same time, the tangential forces Ft and the centrifugal forces Fcf that occur in the process are supported in the area of the torque-proof ring gear 9.

The radial force components Fr resulting in the area of the tooth meshings between the planetary wheels 10 and the ring gear 9 from the asymmetrical tooth profiles during the main rotational direction of the planetary carrier 5 and oriented in the direction of the sun wheel 7, counteract the centrifugal forces Fcf that are to be respectively supported in the area of the bearing appliances 11. In this manner, a bearing load that is respectively applied at the bearings 11 in the radial direction is reduced to the desired extent.

Depending on the respectively present load case, the pressure angle aph is provided in an angular range of between 25° and 60°, while angle values of between 10° and 25° are preferably chosen for the pressure angle aps.

The constructional requirement of providing that the pressure angle aps be always smaller then the pressure angle aph causes the radial force component Fr that is applied in the meshing area between the teeth 7A of the sun wheel 7 and the teeth 10A of the planetary wheels 10 during operation of the planetary gear device 6 to be smaller than the radial force components Fr that are acting in the meshing area between the teeth 10A of the planetary wheels 10 and the teeth 9A of the ring gear 9, whereby the targeted total load relief in the area of the bearing appliances 11 is ensured through the asymmetrical embodiment of the toothings of the ring gear 9, the planetary wheels 10 and the sun wheel 7.

Figure 5:
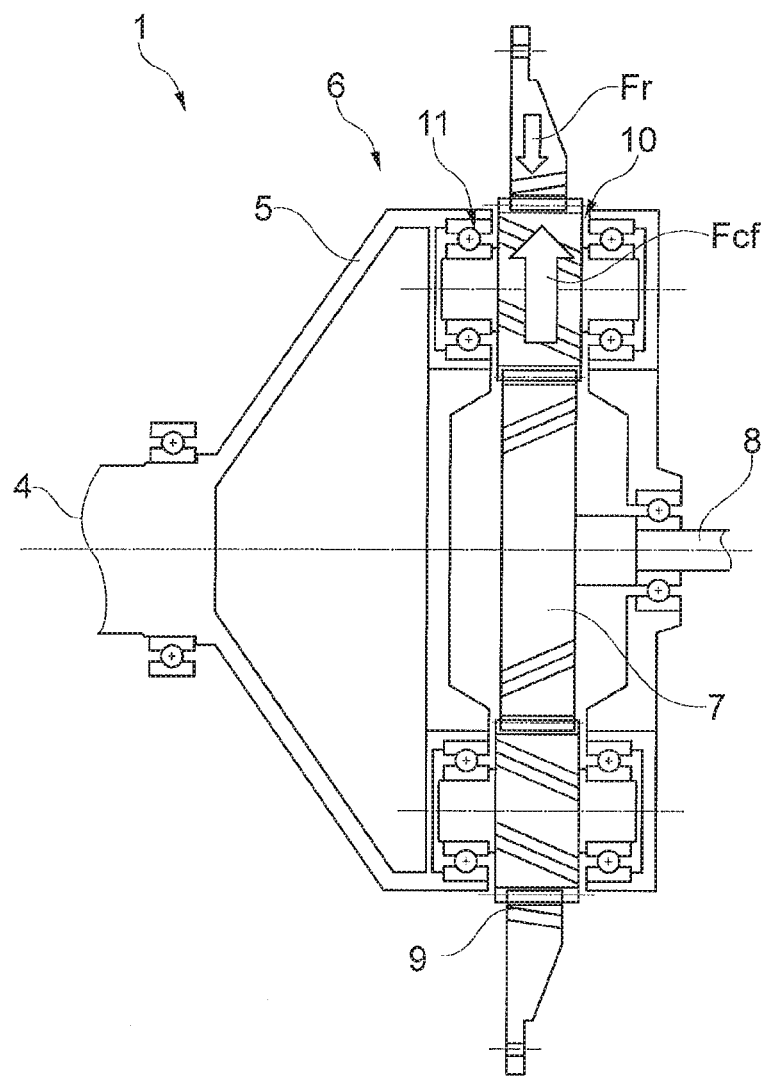
FIG. 5 shows a sectional view of a first embodiment of the planetary gear device along a section line V-V that is shown in more detail in FIG. 2.
Figure 6:
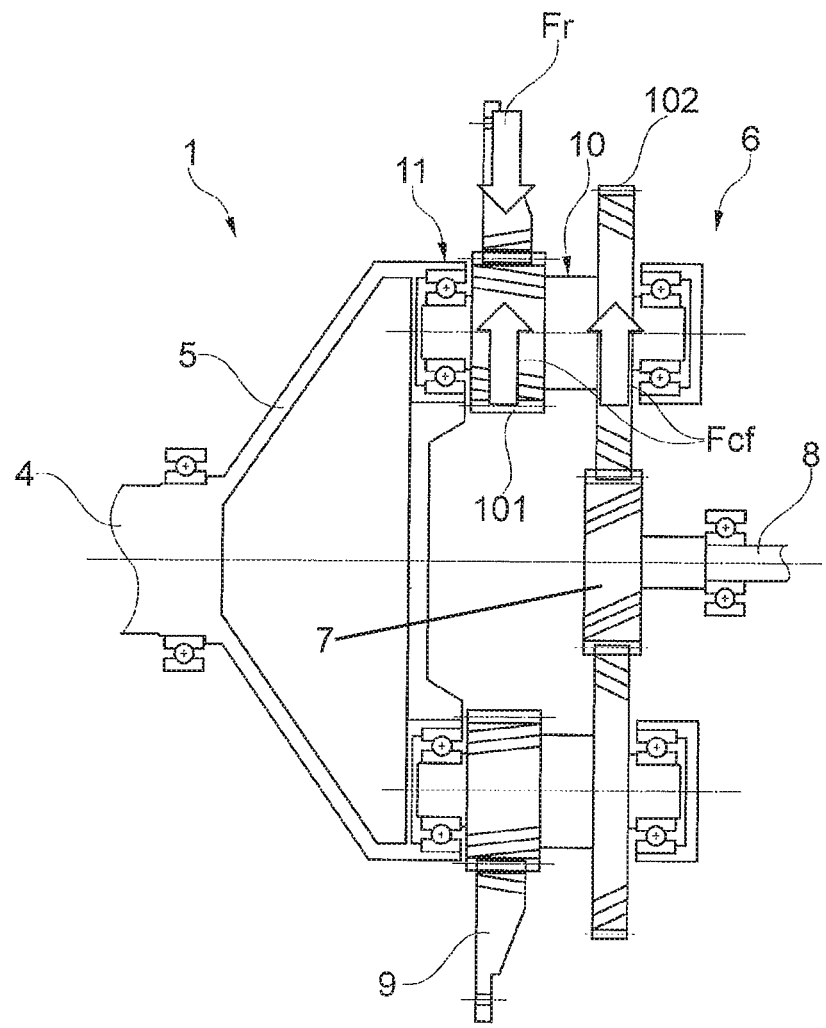
FIG. 6 shows a second rendering of an embodiment of the planetary gear device which corresponds to FIG. 5 and in which the planetary wheels are embodied as double planetary wheels.

FIG. 5 shows a sectional view of a first embodiment of the planetary gear device 6 according to FIG. 2 along the section line V-V, in which the planetary wheels 10 are configured as single planets and the ring gear 9, the planetary wheels 10 and the sun wheel 7 are respectively embodied with a helical gearing. In contrast to that, FIG. 6 shows a rendering of a second exemplary embodiment of the planetary gear device 6 according to FIG. 2 that corresponds to FIG. 5 and that comprises planetary wheels 10 that are configured as double planets. At that, a first planetary wheel area 101 of the planetary wheels 10 respectively combs with the ring gear 9, while a second planetary wheel area 102 of the planetary wheels 10 is respectively in mesh with the sun wheel 7.

Independently of the embodiment of the planetary wheels 10 as single or as double planetary wheels, a profile overlap in the area of the tooth meshings between the planetary wheels 10 and the ring gear 9 is smaller than 2, while the profile overlap in the area of the tooth meshings between the planetary wheels 10 and the sun wheel 7 is greater than or equal to 2.

PART LIST 1 jet engine
2 fan
3 turbine device
4 fan shaft
5 shaft of the planetary gear device, planetary carrier
6 planetary gear device
7 shaft of the planetary gear device, sun wheel
7A tooth
7B tooth flank
8 shaft of the turbine device
9 shaft of the planetary gear device, ring gear
9A tooth
9B tooth flank
10 planetary wheel
10A tooth
10B, 10C tooth flank
101, 102 planetary wheel area
11 bearing appliance
12 rotational direction of the sun wheel
14 main rotational direction of the planetary carrier
15 rotational direction of the planetary wheel
Fcf centrifugal force
Fr radial force component
Ft meshing forces
aph pressure angle
aps pressure angle

The invention claimed is:

1. A planetary gear device comprising:
   a sun wheel including teeth having tooth flanks,
   a ring gear including teeth having tooth flanks, and
   a planetary carrier,
   a planetary wheel including teeth having tooth flanks, the planetary wheel meshing with the sun wheel and the ring gear and mounted in a rotatable manner on the planetary carrier,
   wherein a pressure angle ($\alpha$ph) between the tooth flanks of the teeth of the ring gear and of the planetary wheel, which are in mesh with each other during a main rotational direction of the planetary carrier, is larger than a pressure angle ($\alpha$ps) between the tooth flanks of the teeth of the planetary wheel and of the sun wheel, which are also in mesh with each other during the main rotational direction of the planetary carrier.

2. The planetary gear device according to claim 1, wherein the pressure angle ($\alpha$ph) between the tooth flanks of the teeth of the ring gear and of the planetary wheel is greater than or equal to 25°.

3. The planetary gear device according to claim 1, wherein the pressure angle ($\alpha$ph) between the tooth flanks of the teeth of the ring gear and of the planetary wheel is greater than or equal to 30°.

4. The planetary gear device according to claim 1, wherein the pressure angle ($\alpha$ph) between the tooth flanks of the teeth of the ring gear and of the planetary wheel is less than or equal to 60°.

5. The planetary gear device according to claim 1, wherein the pressure angle ($\alpha$ps) between the tooth flanks of the teeth of the planetary wheel and of the sun wheel is greater than or equal to 10°.

6. The planetary gear device according to claim 1, wherein the pressure angle ($\alpha$ps) between the tooth flanks of the teeth of the planetary wheel and of the sun wheel is less than or equal to 25°.

7. The planetary gear device according to claim 1, wherein a profile overlap is smaller than 2 in a meshing area between the teeth of the planetary wheel and the teeth of the ring gear during the main rotational direction of the planetary carrier.

8. The planetary gear device according to claim 1, wherein a profile overlap is greater than or equal to 2 in a meshing area between the teeth of the planetary wheel and the teeth of the sun wheel during the main rotational direction of the planetary carrier.

9. The planetary gear device according to claim 1, wherein the planetary wheel is a double planet wheel.

10. The planetary gear device according to claim 1, wherein one of the ring gear or the sun wheel is fixed at a housing of the planetary gear device.

11. The planetary gear device according to claim 1, wherein the ring gear, the sun wheel and the planetary wheel have a straight-toothed configuration.

12. The planetary gear device according to claim 1, wherein the ring gear, the sun wheel and the planetary wheel have a helically toothed configuration.

13. A jet engine comprising:
a fan,
a low-pressure shaft that is operatively connected with the fan,
wherein the operative connection between the fan and the low-pressure shaft comprises a planetary gear device according to claim 1.

14. The jet engine according to claim 13, wherein the fan is connected to one of the ring gear, the planetary carrier or the sun wheel, while the low-pressure shaft is operatively connected to another of the sun wheel, the planetary carrier or the ring gear.

15. The planetary gear device according to claim 1, wherein the ring gear, the sun wheel and the planetary wheel have a double-helically toothed configuration.

* * * * *